No. 774,628. PATENTED NOV. 8, 1904.
J. M. WILKINSON.
ANIMAL TRAP.
APPLICATION FILED MAR. 31, 1904.
NO MODEL.

John M. Wilkinson,
Inventor

Witnesses

No. 774,628. Patented November 8, 1904.

UNITED STATES PATENT OFFICE.

JOHN MARION WILKINSON, OF KAUFMAN, TEXAS.

ANIMAL-TRAP.

SPECIFICATION forming part of Letters Patent No. 774,628, dated November 8, 1904.

Application filed March 31, 1904. Serial No. 200,917. (No model.)

*To all whom it may concern:*

Be it known that I, JOHN MARION WILKINSON, a citizen of the United States, residing at Kaufman, in the county of Kaufman and State of Texas, have invented certain new and useful Improvements in Animal-Traps; and I do declare the following to be a full, clear, and exact description of the invention, such as will enable others skilled in the art to which it appertains to make and use the same.

This invention relates to traps for catching coons and other game which paw at the bait, and has for its object to provide simple and efficient means for automatically catching and holding the animal's foot or leg while engaged in pawing the bait, thus enabling animals too suspicious to bite or nibble at the bait at once to be ensnared and preventing the loss of those ordinarily scared off before the bait is taken.

To this end the invention consists of certain novel features of construction, combination, and arrangement of parts, as will be hereinafter more fully described, and particularly pointed out in the appended claim.

Figure 1:
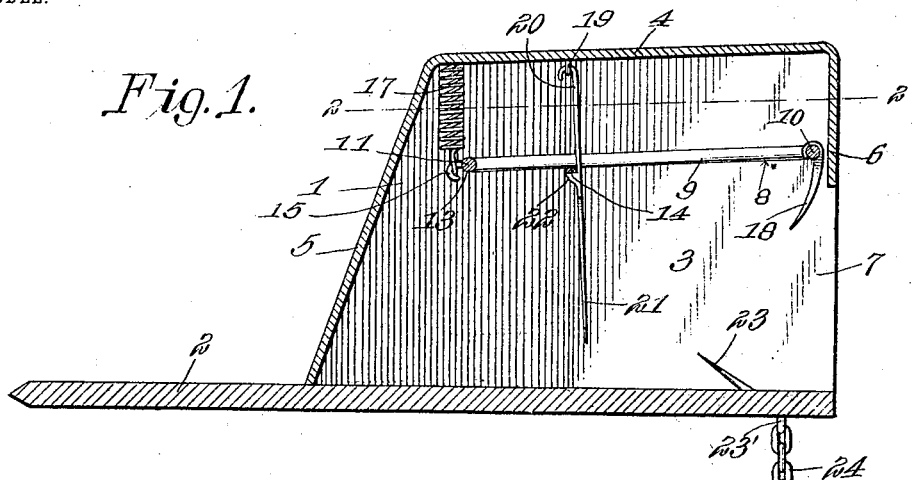
Figure 2:
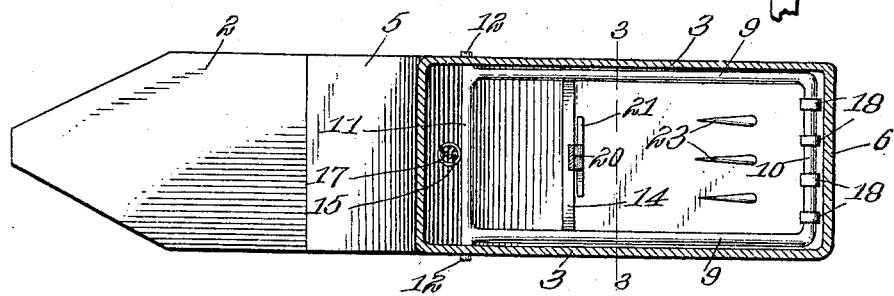
Figure 3:
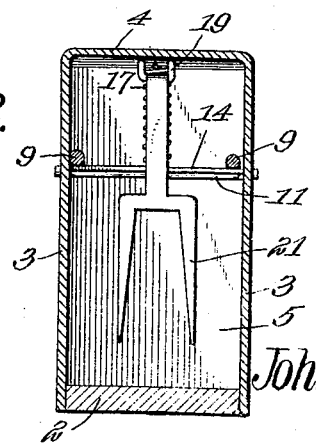

In the drawings, Figure 1 is a longitudinal section of a trap embodying my invention. Fig. 2 is a sectional plan view thereof, and Fig. 3 is a vertical transverse section.

Referring to the drawings, 1 represents the casing of the trap, which may be of any approved form and construction, but which is shown in the present instance as consisting of a base 2, side walls 3, connected to and rising from the base, a top wall 4, a rear end wall 5, and a short depending frontwall 6, which latter terminates a sufficient distance above the base to form an opening or passage 7 for the insertion of the paw of the animal.

Within the casing is arranged a lever 8, comprising a frame formed of longitudinal side bars 9, connected at their front and rear ends by cross bars or rods 10 and 11, the latter having laterally-projecting trunnions 12, journaled in bearing-openings 13 in the side walls 3 of the casing, whereby said lever is mounted to swing in a vertical plane adjacent to the rear cross-bar 11. The side bars of the lever are further connected by a cross-bar 14, operating as a detent, as hereinafter described. From the rear cross-bar 11 extends a hook 15, to which is connected one end of a contractile spring 17, the opposite end of which is attached to the upper wall 4 of the casing. This spring normally draws upward on the hook 15 by its contractile energy, and thereby serves to rock the lever on its trunnions 12 and to project the forward end thereof downwardly. The said forward end of the lever carries a series of detaining tines or prongs 18, which are fixed at their upper ends to the cross-bars 10 and are curved on a suitable radius to incline downwardly and rearwardly, as clearly shown in Fig. 1.

Pivoted at its upper end, as indicated at 19, to the top wall 4 of the casing at a point on a line slightly in advance of the detent 14 of the lever 8 is a trigger 20, which hangs pendent within the casing and is provided at its lower end with a bait-holding fork 21 and is formed or provided above the same with a catch or shoulder 22, which is adapted to take under the detent or cross-bar 14 of the lever to hold the forward end of the latter elevated against resistance of the spring 16. When the said trigger 20 is pulled forwardly under the action of an animal pawing at the bait carried by the fork 21, the shoulder or catch 22 will be withdrawn from under the detent 14, as will be readily understood, allowing the spring 17 to draw upwardly on the hook 15, and thereby projecting the forward end of the lever 8 and the detaining tines or prongs 18 downward.

Arranged to coact with the said prongs or tines 18 are detaining prongs or tines 23, embedded in or suitably secured to the base 2 adjacent to the passage 7 and projecting upwardly and rearwardly from the base at a suitable angle to coöperate with the tines 18 to hold the foot of the ensnared animal against withdrawal.

In the operation of the device the fork 21 is baited and the trap set by swinging the lever 8 upwardly and then swinging the trigger 20 rearwardly to move the catch 22 beneath the shoulder 14, and thereby hold the lever elevated. When an animal attracted by the bait passes his paw in through the opening 7 and paws at the bait on the fork 21, the forward movement imparted to the latter thereby will swing the trigger 20 forwardly, and the catch 22 will move from under the detent 14, and the forward end of the lever 8 will be turned downwardly by the action of the spring 17. By this means the prongs or tines 18 will be forced down against the paw or foot of the animal and will press the same against the tines 23, the withdrawal of the paw or foot being prevented by the inclination of the two sets of tines, which will be caused to penetrate into the foot or paw when the animal attempts to draw the same back through the opening 7. The tines 18 and 23 may have sharpened ends to more effectually deter any attempts of the animal to escape.

The trap may be held or secured at the point of use in any preferred way. In the present instance I have shown it provided with a chain or like connection 24, secured at one end by a staple 23' to the base 2 and provided at its opposite end with an anchor 24'. The anchor and chain are intended to be embedded in the ground to firmly anchor the trap and prevent it from being carried off or moved by the struggling animal.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention.

Having thus described my invention, what I claim, and desire to secure by Letters Patent, is—

An animal-trap comprising a casing provided with an inlet-opening, rearwardly-inclined detaining-prongs fixed to the floor of the casing, a lever having a front cross-bar and pivoted within the casing near the rear wall thereof, a spring connected to said lever and to the casing for throwing the front end of the lever downward, detaining-prongs on the front cross-bar of said lever, a swinging bait-fork pivoted to the upper wall of the casing and provided with a shoulder or detent, and a cross-bar on the lever for engaging the detent, substantially as described.

In testimony whereof I have hereunto set my hand in presence of two subscribing witnesses.

JOHN MARION WILKINSON.

Witnesses:
   JIM T. BOGGS,
   HENRY A. SPARKS.